United States Patent
Bychkov et al.

(10) Patent No.: US 8,451,127 B2
(45) Date of Patent: *May 28, 2013

(54) JACKET LOCATOR

(75) Inventors: Eyal Bychkov, Hod Hasharon (IL); Tal Engelstein, Ramat Gan (IL); Yair Leshem, Tel Aviv (IL); Uri Ron, Tel Aviv (IL); Ron Levy, Savyon (IL); Hagit Perry, Herzilya (IL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/567,057

(22) Filed: Aug. 5, 2012

(65) Prior Publication Data

US 2012/0306647 A1 Dec. 6, 2012

Related U.S. Application Data

(63) Continuation of application No. 12/476,261, filed on Jun. 2, 2009, now Pat. No. 8,258,960.

(60) Provisional application No. 61/130,784, filed on Jun. 2, 2008.

(51) Int. Cl.
*G08B 13/14* (2006.01)

(52) U.S. Cl.
USPC .............. 340/572.8; 340/539.13; 340/539.32; 455/414.2; 455/456.1; 455/556.1

(58) Field of Classification Search
USPC ................. 340/572.8, 539.13, 539.32, 568.1, 340/568.7, 571; 455/414.2, 456.1, 556.1, 455/575.1, 90.3, 558, 557, 426.1, 550.1; 379/433.11

See application file for complete search history.

(56) References Cited

U.S. PATENT DOCUMENTS

| | | |
|---|---|---|
| 5,625,673 A | 4/1997 | Grewe et al. |
| 5,628,055 A | 5/1997 | Stein |
| 5,809,115 A | 9/1998 | Inkinen |
| 5,893,037 A | 4/1999 | Reele et al. |
| 5,907,815 A | 5/1999 | Grimm et al. |
| 6,188,917 B1 | 2/2001 | Laureanti |
| 6,201,867 B1 | 3/2001 | Koike |
| 6,243,578 B1 | 6/2001 | Koike |
| 6,477,357 B1 | 11/2002 | Cook |

(Continued)

FOREIGN PATENT DOCUMENTS

| | | |
|---|---|---|
| EP | 1871075 A1 | 12/2007 |
| GB | 2438448 A1 | 11/2007 |

(Continued)

*Primary Examiner* — Brent Swarthout
(74) *Attorney, Agent, or Firm* — Soquel Group LLC (57) ABSTRACT

A locator system for electronic devices including at least one jacket for a modular wireless communicator, each jacket having an identifier, and a modular wireless communicator that attaches to each one of the at least one jacket, including a positioning system for identifying a location of the modular wireless communicator, a log manager for recording a plurality of entries in a log, each entry including the jacket identifier for a jacket currently attached to the modular wireless communicator, and a current location as identified by the positioning system, and a controller for notifying the log manager of occurrence of a log trigger event, wherein the log manager records a new entry in the log when it receives a notification of a log trigger event from the controller, and wherein the log trigger events enable determination of a location where a jacket was last actively used with the modular wireless communicator.

20 Claims, 7 Drawing Sheets

U.S. PATENT DOCUMENTS

| | | | |
|---|---|---|---|
| 6,516,202 B1 | 2/2003 | Hawkins et al. | |
| 6,640,113 B1 | 10/2003 | Shim et al. | |
| 6,690,947 B1 | 2/2004 | Tom | |
| 6,898,283 B2 | 5/2005 | Wycherley et al. | |
| 6,907,264 B1 | 6/2005 | Sterkel | |
| 6,999,792 B2 | 2/2006 | Warren | |
| 7,085,542 B2 | 8/2006 | Dietrich et al. | |
| 7,194,285 B2 | 3/2007 | Tom | |
| 7,266,391 B2 | 9/2007 | Warren | |
| 7,400,884 B2 | 7/2008 | Fok et al. | |
| 7,477,919 B2 | 1/2009 | Warren | |
| 7,515,937 B2 | 4/2009 | Lee | |
| 8,258,960 B2 * | 9/2012 | Bychkov et al. | 340/572.8 |
| 2002/0090980 A1 | 7/2002 | Wilcox et al. | |
| 2002/0151327 A1 | 10/2002 | Levitt | |
| 2004/0233930 A1 | 11/2004 | Colby, Jr. | |
| 2004/0268005 A1 | 12/2004 | Dickie | |
| 2005/0159184 A1 | 7/2005 | Kerner et al. | |
| 2006/0003804 A1 | 1/2006 | Liu | |
| 2006/0105722 A1 | 5/2006 | Kumar | |
| 2006/0190321 A1 | 8/2006 | Martins Nicho et al. | |
| 2006/0241353 A1 | 10/2006 | Makino et al. | |
| 2007/0004450 A1 | 1/2007 | Parikh | |
| 2007/0018957 A1 | 1/2007 | Seo | |
| 2007/0079030 A1 | 4/2007 | Okuley et al. | |
| 2007/0161404 A1 | 7/2007 | Yasujima et al. | |
| 2007/0288583 A1 | 12/2007 | Rensin et al. | |
| 2008/0009325 A1 | 1/2008 | Zinn et al. | |
| 2008/0040354 A1 | 2/2008 | Ray et al. | |
| 2008/0065315 A1 | 3/2008 | Guy et al. | |
| 2008/0140886 A1 | 6/2008 | Izutsu | |
| 2008/0157961 A1 | 7/2008 | Park et al. | |
| 2008/0317456 A1 | 12/2008 | Lee et al. | |
| 2009/0065578 A1 | 3/2009 | Peterson et al. | |
| 2009/0324025 A1 | 12/2009 | Camp, Jr. et al. | |
| 2009/0325599 A1 | 12/2009 | Vuori | |
| 2010/0229101 A1 | 9/2010 | Lagerstedt et al. | |

FOREIGN PATENT DOCUMENTS

| | | |
|---|---|---|
| WO | 9421058 A1 | 9/1994 |
| WO | 0059247 A1 | 10/2000 |
| WO | 0186922 A1 | 11/2001 |
| WO | 03103174 A1 | 12/2003 |

* cited by examiner

JACKET LOCATOR

PRIORITY REFERENCE TO RELATED APPLICATIONS

This application claims benefit of U.S. Provisional Application No. 61/130,784, entitled JACKET LOCATOR, filed on Jun. 2, 2008 by inventors Eyal Bychkov, Tal Engelstein, Yair Leshem, Uri Ron, Ron Levy and Hagit Perry.

FIELD OF THE INVENTION

The field of the present invention is wireless communication.

BACKGROUND OF THE INVENTION

With advances in miniaturization of electronic components, ever smaller consumer electronic devices are becoming available. Mobile phones, PDAs, cameras and media players are some examples of such devices. These and other devices have become so small that they fit inside a shirt pocket. As a result, people are tending to misplace these devices.

Various solutions have been proposed to locate misplaced electronic devices. One such solution uses sets of electronic locators, which are attached to the small devices. An example of such a locator is the KeyRinger™ manufactured by Sierra Systems of Oakland, Calif. When one of a set of KeyRingers is pressed, the other KeyRingers produce audible and visible indications, which enable an owner to find them.

Another such solution uses a transmitter and a receiver, where the receiver knows its distance from the transmitter. The transmitter is generally attached to a small device, and the receiver indicates to an owner when the distance between the receiver and the small device exceeds a predefined threshold.

A drawback with conventional solutions to locate misplaced devices is that the transmitters, which are attached to or embedded in the devices, require a power source, typically a battery. If the battery is not regularly replaced or recharged, then the transmitters fail.

It would thus be of advantage to have a locator for electronic devices that does not require transmitters attached to or embedded in the devices.

SUMMARY OF THE DESCRIPTION

Aspects of the present invention provide a system and method for locating electronic devices, without the need for attaching or embedding transmitters to the devices.

Embodiments of the present invention relate to a modular wireless communicator that attaches to a plurality of electronic devices referred to herein as jackets. The wireless communicator enhances the jackets by providing them with wireless connectivity, and the jackets enhance the wireless communicator by providing electronics and interfaces. In an embodiment of the present invention, the wireless communicator has an embedded global positioning system (GPS). The GPS operates in conjunction with the wireless communicator so that at locations where GPS signals are weak or unavailable, such as indoors, the GPS uses cellular location sensing capabilities to determine position. An example of such an enhanced GPS is the eGPS® system manufactured by CSR plc of the United Kingdom.

The wireless communicator maintains a history log of the jackets to which it is attached, and the locations and times of attachment to and detachment from these jackets. The history log includes entries that record (i) a jacket identifier, (ii) a GPS location, and (iii) a date & time. A history log manager adds new entries to the history log when log trigger events occur. Log trigger events include powering on/off of the wireless communicator, attaching/detaching the wireless communicator to/from a jacket, using the wireless communicator to dial a phone number, using the wireless communicator to send an SMS/MMS message, using the wireless communicator to play an audio/video file, and using the wireless communicator to browse a designated web site.

A user can view the history log on his wireless communicator in order to locate a jacket that he misplaced. Moreover the wireless communicator's GPS generates navigable directions to reach a designated one of any location recorded in the history log.

There is thus provided in accordance with an embodiment of the present invention a locator system for electronic devices including at least one jacket for a modular wireless communicator, each jacket having a unique identifier, and a modular wireless communicator that attaches to each one of the at least one jacket, including a positioning system for identifying a location of the wireless communicator, a clock for identifying a date & time, a log manager, coupled with the positioning system and with the clock, for recording a plurality of entries in a history log, each entry including (i) a jacket identifier, (ii) a location as identified by the positioning system, and (iii) a date & time as identified by the clock, and a controller coupled with the log manager for notifying the log manager of occurrence of a log trigger event, wherein the log manager records a new entry in the history log when it receives a notification of a log trigger event from the controller.

There is also provided in accordance with an embodiment of the present invention a locator method, including maintaining a history log for a wireless communicator that attaches to a plurality of jackets, each jacket having a unique identifier, the history log including a plurality of entries and each entry including (i) a jacket identifier, (ii) a location, and (iii) a date & time, monitoring the wireless communicator for detection of occurrence of a log trigger event, and in response to detection of occurrence of a log trigger event, adding a new entry to the history log.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to a small modular wireless communicator that connects to a plurality of other electronic devices and enables the other devices to communicate wirelessly. The modular wireless communicator of the present invention operates both in standalone mode as a wireless phone, and also in conjunction with devices to which it is connected.

The devices to which the wireless communicator connects may be jacket covers, which include user interface controls for operating the wireless communicator; or they may be electronic devices having other functionality including inter alia cameras, media players and portable digital assistants (PDAs). For ease of exposition, these devices to which the wireless communicator connects are referred to herein generically as jackets. When the wireless communicator is connected to a jacket, the jacket enriches the capabilities of the wireless communicator, and the wireless communicator enriches the capabilities of the jacket.

Figure 1:
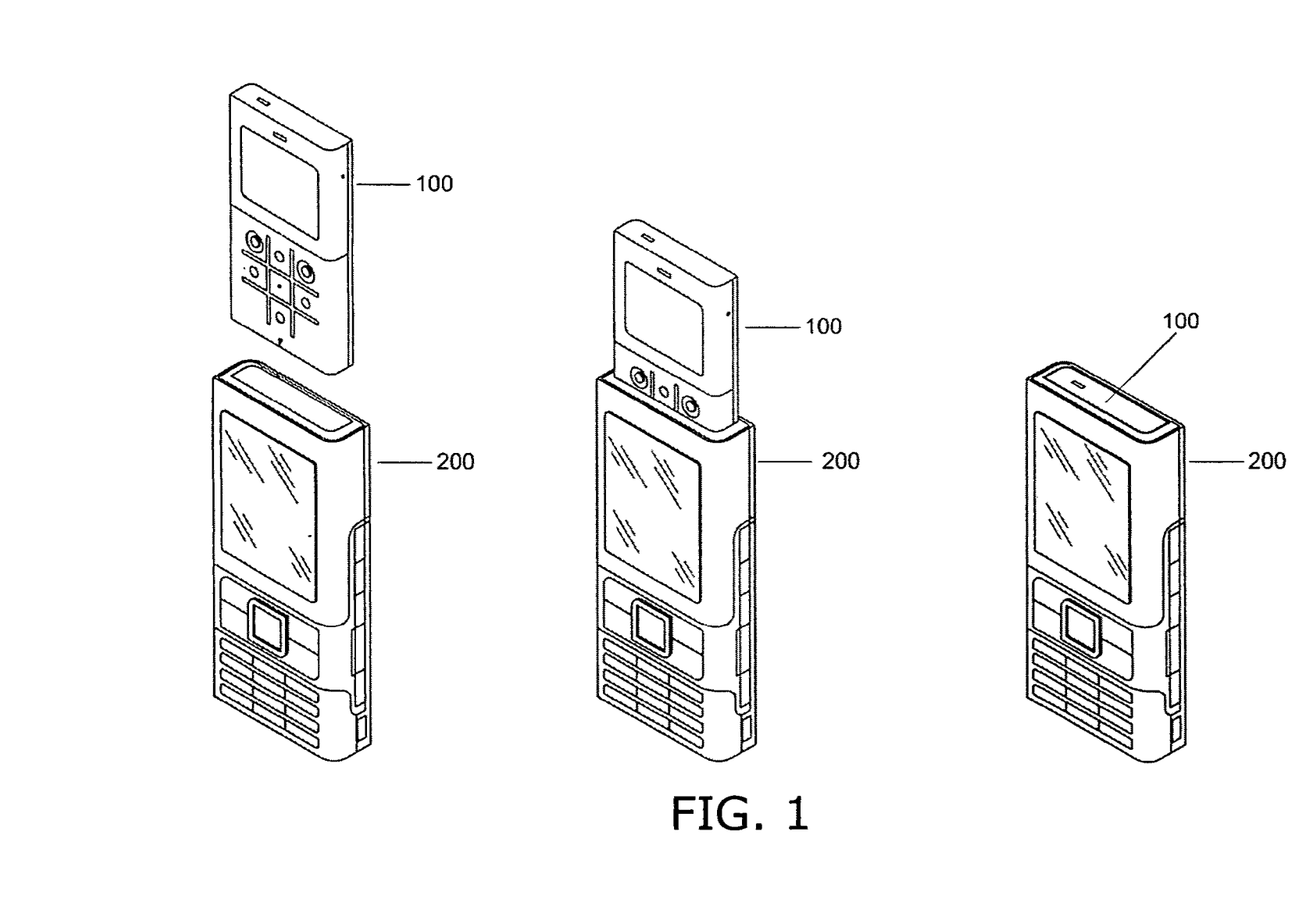
FIG. 1 is an illustration of a wireless communicator being inserted into a jacket, in accordance with an embodiment of the present invention.

Reference is now made to FIG. 1, which is an illustration of a wireless communicator 100 being inserted into a jacket 200, in accordance with an embodiment of the present invention.

Figure 2:
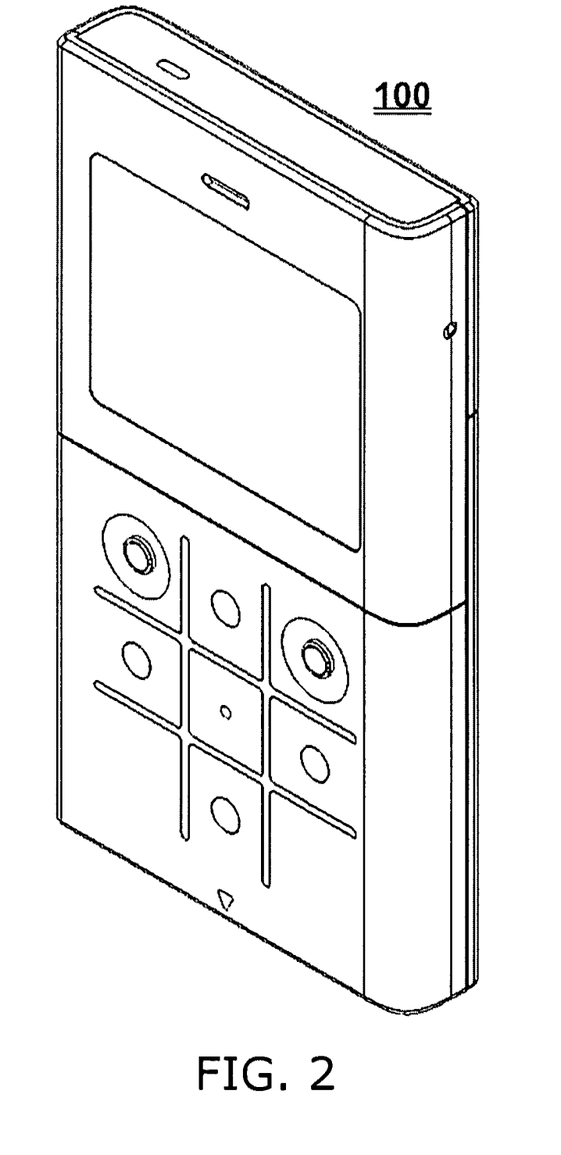
FIG. 2 is an illustration of the wireless communicator of FIG. 1, in accordance with an embodiment of the present invention.

Reference is now made to FIG. 2, which is an illustration of wireless communicator 100, in accordance with an embodiment of the present invention.

Figure 3:
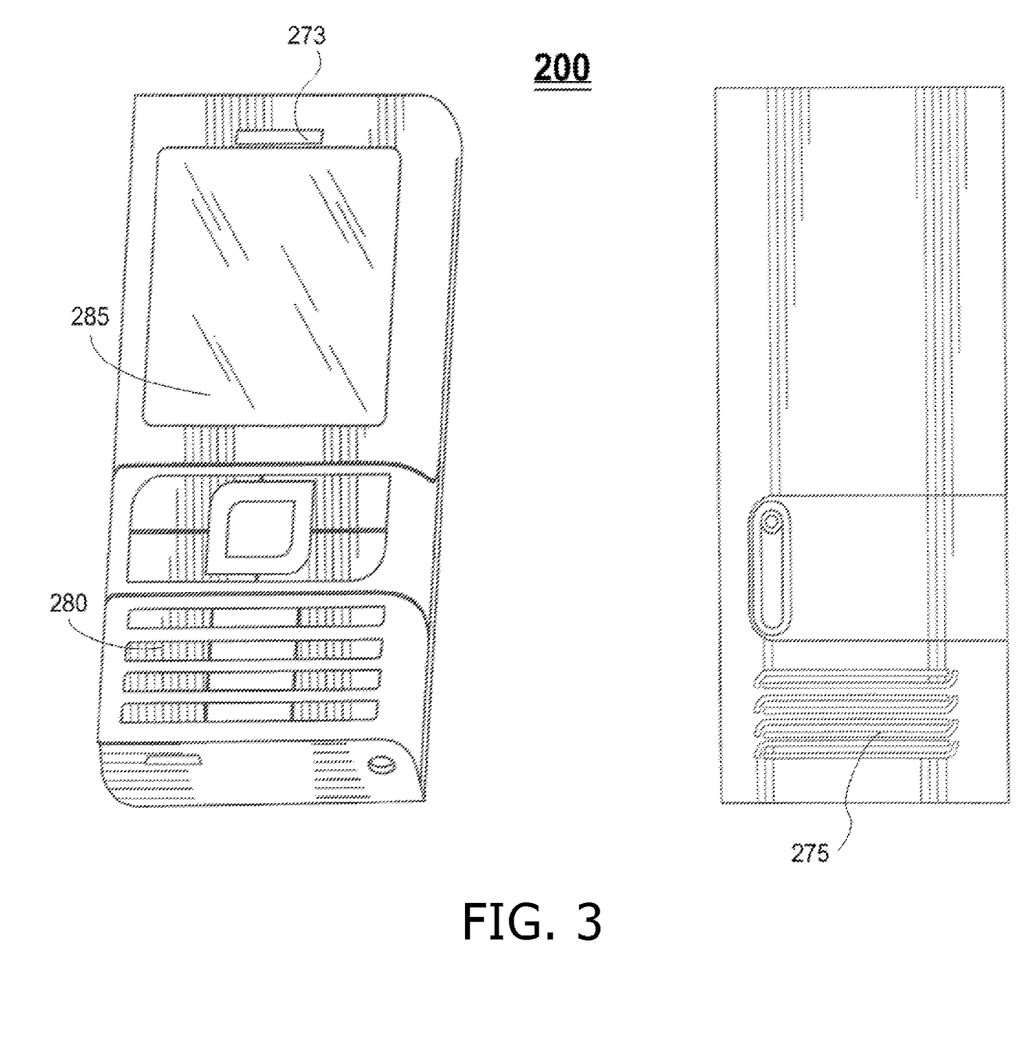
FIG. 3 is an illustration of the jacket of FIG. 1, in accordance with an embodiment of the present invention.

Reference is now made to FIG. 3, which is an illustration of jacket 200, in accordance with an embodiment of the present invention. Jacket 200 shown in FIG. 3 includes a user interface for an audio/video player. Specifically, jacket 200 includes a microphone 271 (shown in FIG. 6), an earpiece 273, speakers 275, a keypad 280 and a display 285.

It will be appreciated by those skilled in the art that the components of jacket 200 in FIG. 3 are illustrative of one jacket design, and that the present invention applies to a wide variety of jacket designs. It will similarly be appreciated that the present invention applies to a wide variety of types of wireless communicators, including inter alia 2.5G communicators, 3G communicators and CDMA communicators. In this regard reference is now made to FIG. 4, which is an illustration of a plurality of wireless communicators 100a-100c and a plurality of jackets 200a-200h, whereby each wireless communicator 100a-100c may be attached to any of the jackets 200a-200h so as to operate in combination therewith, in accordance with an embodiment of the present invention.

Figure 5:
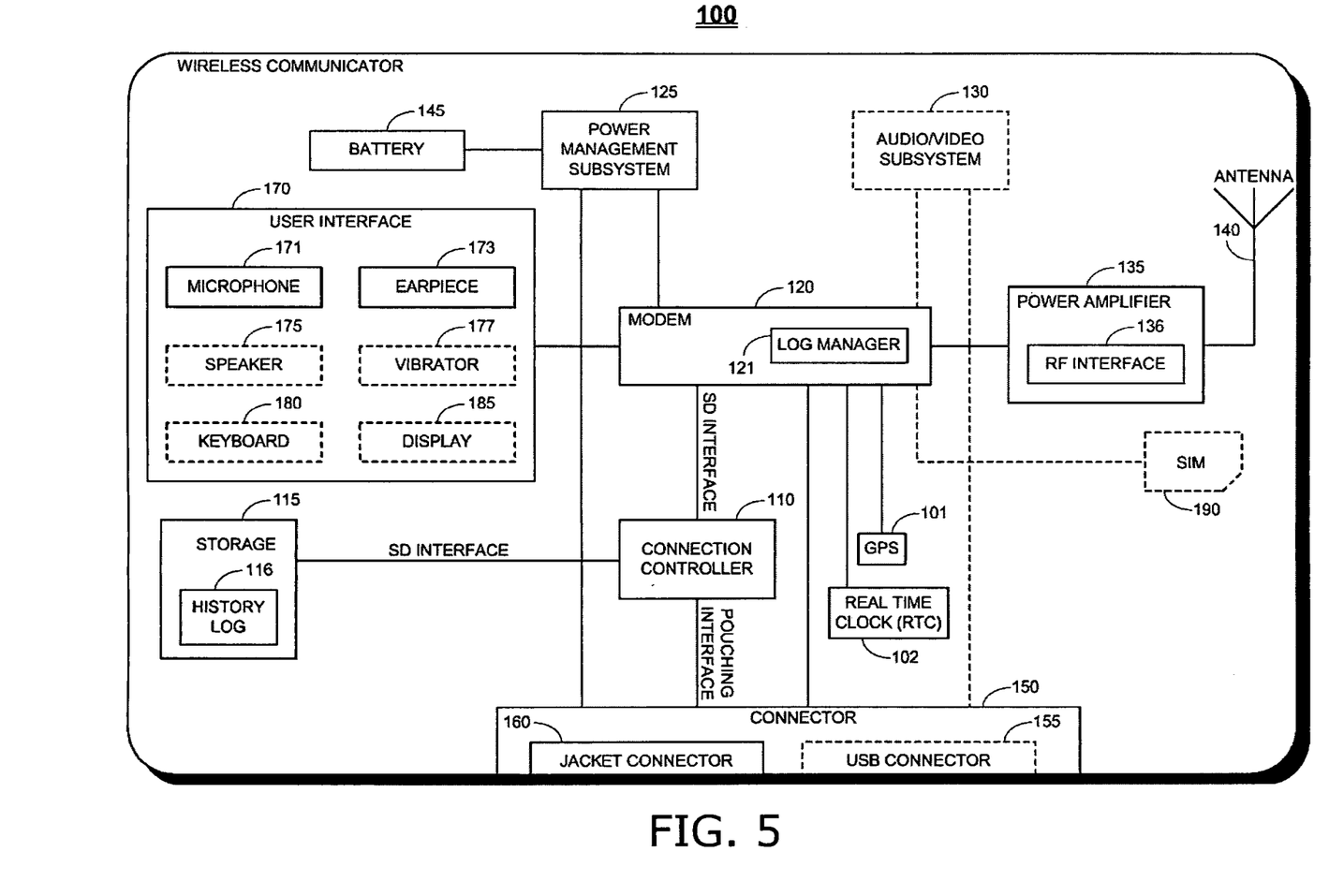
FIG. 5 is a simplified block diagram of the wireless communicator of FIG. 1, in accordance with an embodiment of the present invention.

Reference is now made to FIG. 5, which is a simplified block diagram of wireless communicator 100, in accordance with an embodiment of the present invention. Wireless communicator 100 includes eight primary components, as follows: a global positioning system (GPS) 101, a real time clock (RTC) 102, a connection controller 110, a memory storage 115, a modem 120 for sending and receiving data and voice communications, a power management subsystem 125, a power amplifier 135 and a user interface 170.

Modem 120 includes a log manager 121, which writes and maintains a history log 116 in storage 115, recording a history of jackets to which wireless communicator 100 is attached and detached. Each record in history log 116 includes entries for (i) jacket, (ii) location and (iii) time, indicating where and when wireless communicator 100 was attached to and detached from each jacket 200. Jackets 200 are specified in history log 116 by a jacket UID. Location is specified in history log 116 by using GPS 101. Time is specified in history log 116 as a date & time according to RTC 102. Since history log 116 is maintained by wireless communicator 100, there is no need for transmitters and power sources in the jackets.

Further in accordance with an embodiment of the present invention, log manager 121 updates history log 116 upon occurrence of log trigger events. Such log trigger events include inter alia one or more of the following events:
  Attachment of wireless communicator 100 to a jacket 200;
  Detachment of wireless communicator 100 from a jacket 200;
  Powering on of wireless communicator 100;
  Powering off of wireless communicator 100;
  Dialing a phone number;
  Sending SMS/MMS messages;
  Browsing specified websites;
  Playing audio/video files;
  Arriving at a location of interest;
  Departing from a location of interest; and
  Passing of a designated time period.

Connection controller 110 executes programmed instructions that control the data flow between wireless communicator 100 and jacket 200. Modem 120 controls the wireless communication functionality of wireless communicator 100. Power management subsystem 125 includes charging circuitry for charging a battery 145. Power amplifier 135 includes a radio frequency (RF) interface 136, and is connected to an antenna 140. User interface 170 includes a microphone 171 and an earpiece 173. User interface 170 also includes an optional speaker 175, an optional vibrator 177, an optional keyboard 180 and an optional display 185. It will be appreciated by those skilled in the art that user interface 170 may include additional components.

Wireless communicator 100 includes an optional audio/video subsystem 130, which includes inter alia a voice, audio and video interface.

Wireless communicator 100 includes a connector 150, which itself includes a jacket connector 160 and an optional USB connector 155. Jacket connector 160 is used for attaching wireless communicator 100 to jacket 200. Wireless communicator 100 optionally includes a subscriber identification module (SIM) 190.

Wireless communicator 100 operates in standalone mode or in conjunction with jackets, such as jacket 200 shown in FIG. 3, when it is connected to the jackets via connector 160.

In accordance with an embodiment of the present invention, the interface between connection controller 110 and storage 115, and the interface between connection controller 110 and modem 120 are SD interfaces. The interface between connection controller 110 and jacket connector 160 is a customized connector interface.

Figure 6:
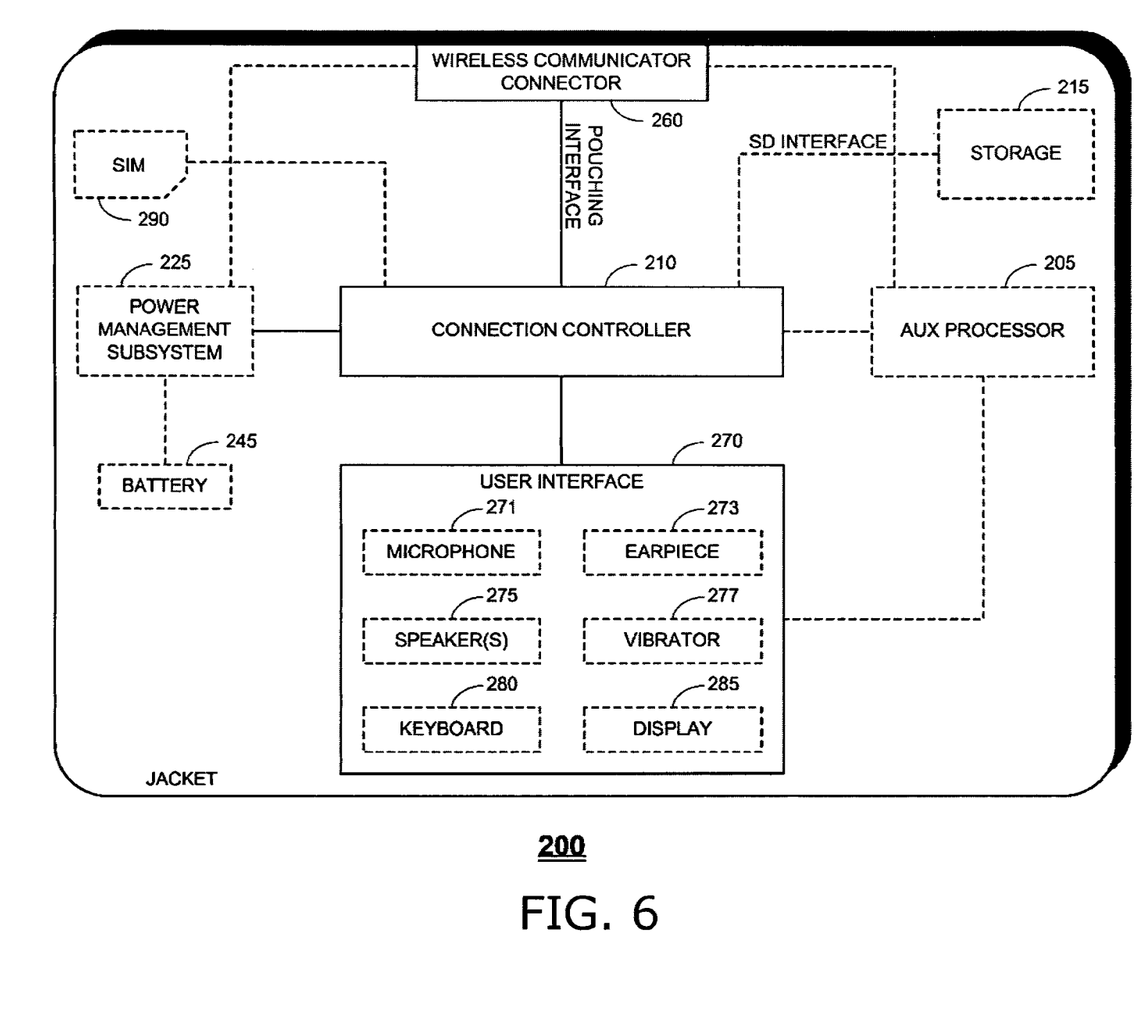
FIG. 6 is simplified block diagram of the jacket of FIG. 1, in accordance with an embodiment of the present invention.

Reference is now made to FIG. 6, which is simplified block diagram of jacket 200, in accordance with an embodiment of the present invention. Jacket 200 includes a connection controller 210 and a wireless communicator connector 260, for attaching wireless communicator 100 to jacket 200 via the wireless communicator's connector 160. Jacket 200 includes an optional auxiliary processor 205, an optional storage 215, an optional power management subsystem 225, an optional battery 245, and an optional SIM 290.

Jacket 200 comes with a user interface 270 including an optional microphone 271, an optional earpiece 273, an optional mono speaker or optional stereo speakers 275, an optional vibrator 277, an optional keyboard 280 and an optional display 285. It will be appreciated by those skilled in the art that user interface 270 may include additional components.

In accordance with an embodiment of the present invention, the interface between connection controller 210 and storage 215 is an SD interface. The interface between connection controller 210 and connector 260 is a customized connector interface.

Figure 7:
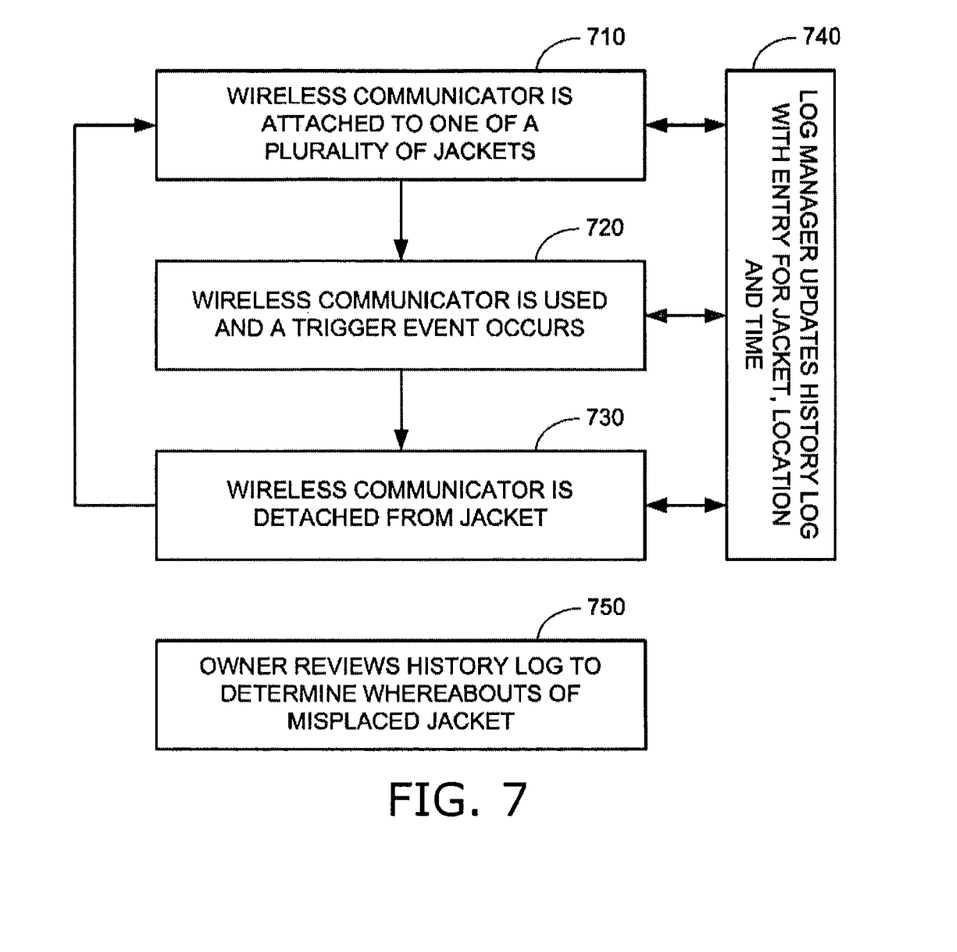
FIG. 7 is a simplified flowchart of a method for locating a misplaced jacket using a history log stored in the wireless communicator, in accordance with an embodiment of the present invention.

Reference is now made to FIG. 7, which is a simplified flowchart of a method for locating a misplaced jacket using a history log stored in the wireless communicator, in accordance with an embodiment of the present invention. At step 710 an owner attaches his wireless communicator 100 to one of a plurality of his jackets 200, such as one of the jackets shown in FIG. 4. At step 720 the owner, in using the jacket to which wireless communicator is attached, activates a log trigger event. At step 730 the owner detaches his wireless communicator 100. Processing then returns to step 710 where the owner attaches his wireless communicator 100 to the same or to a different jacket 200.

At each event 710, 720 and 730, log manager 121 updates history log 116 with an entry recording the specific jacket 200 being used at the event, the location of the event, and the date & time of the event, as indicated at step 740.

At step 750 the owner reviews the history log in his wireless communicator 100 to locate the whereabouts of one or more jackets that he misplaced after detaching wireless communicator 100 therefrom.

Figure 4:
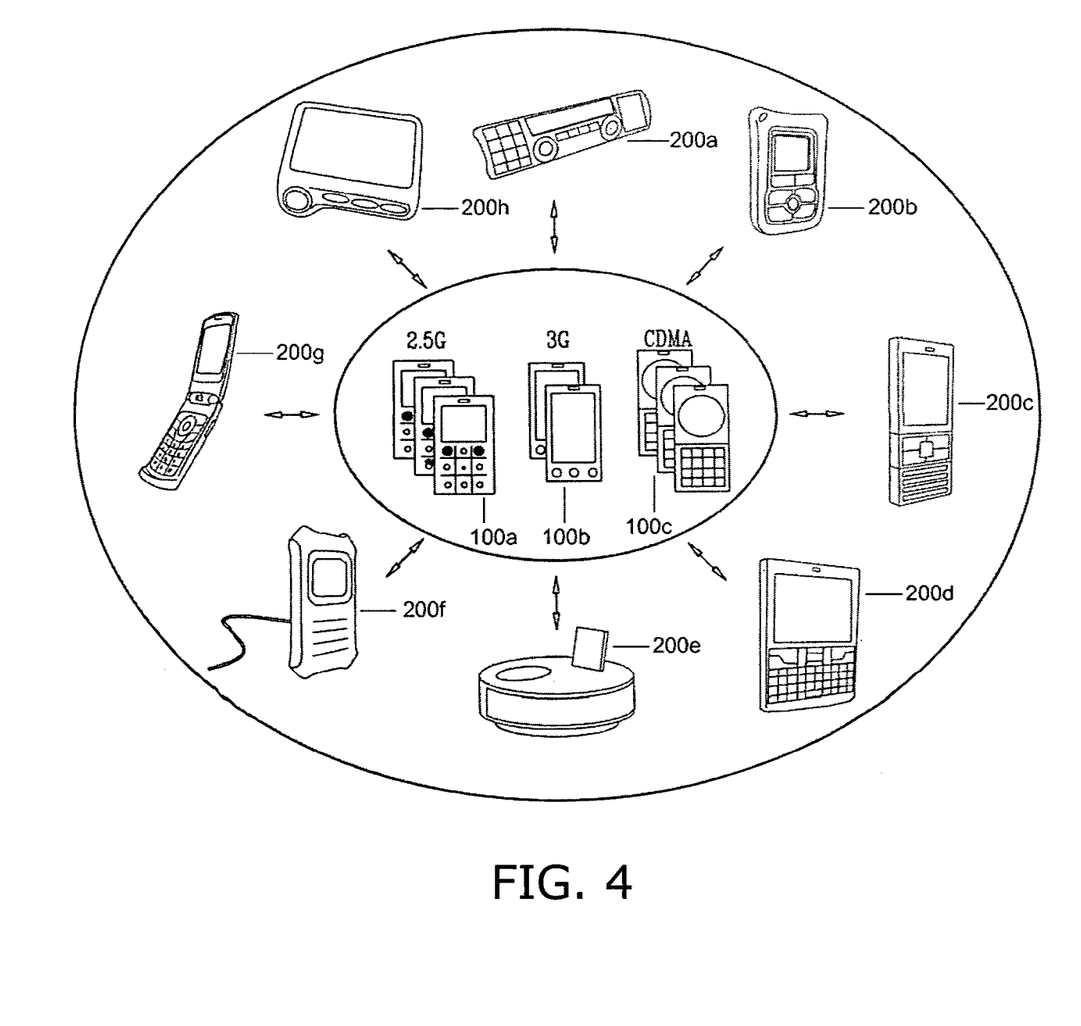
FIG. 4 is an illustration of a plurality of wireless communicators and a plurality of jackets, whereby each wireless communicator may be attached to any of the jackets so as to operate in combination therewith, in accordance with an embodiment of the present invention.

An example usage scenario is that of a user who uses his wireless communicator 100 in his car, by attaching it a jacket, such as jacket 200a of FIG. 4, which is an audio deck for a car. If the user forgets where he parked his car, he can review the history log of his wireless communicator 100 to find the last location of audio deck jacket 200a. Moreover, in an embodiment of the present invention GPS 101 directs the owner to the location of his parked car as recorded in the history log.

In reading the above description, persons skilled in the art will realize that there are many apparent variations that can be applied to the methods and systems described. Thus it may be appreciated that GPS 101 is not required in some embodiments of the present invention. Instead, wireless communicator 100 determines its position based on connections to other devices in its vicinity using inter alia Near Field Communication (NFC), Radio Frequency Identification (RFID), Bluetooth, infra-red (IR) and WiFi connections. E.g., a user may connect wireless communicator 100 and jacket 200 to a WiFi hot spot in a coffee shop, and the location of the coffee shop is recorded in history log 116.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A locator system for electronic devices comprising:
   at least one jacket for a modular wireless communicator, each jacket having an identifier; and
   a modular wireless communicator that attaches to each one of said at least one jacket, comprising:
      a positioning system for identifying a location of the modular wireless communicator;
      a log manager, coupled with said positioning system, for recording a plurality of entries in a log, each entry comprising the jacket identifier for a jacket currently attached to the modular wireless communicator, and a current location as identified by said positioning system; and
      a controller coupled with said log manager for notifying said log manager of occurrence of a log trigger event, wherein said log manager records a new entry in the log when it receives a notification of a log trigger event from said controller, wherein the log trigger event includes a designated action performed by a jacket to which said modular wireless communicator is attached, from among the group consisting of sending an SMS or an MMS message, browsing a designated web site, and playing an audio or a video file, whereby the log trigger events enable determination of a location where a jacket was last actively used with said modular wireless communicator.

2. The locator system of claim 1 wherein said modular wireless communicator further comprises a log reader, for viewing the plurality of entries recorded in the log.

3. The locator system of claim 1 wherein said positioning system generates navigable directions to reach a designated one of the locations recorded in the log.

4. The locator system of claim 1 wherein aid positioning system is a global positioning system (GPS).

5. The locator system of claim 1 wherein said positioning system is a cellular based positioning system.

6. The locator system of claim 1 wherein said positioning system identifies the location of said wireless communicator based on a connection to a device in its vicinity.

7. The locator system of claim 6 wherein said positioning system identifies the location of said modular wireless communicator based on a near field communication (NFC) connection.

8. The locator system of claim 6 wherein said positioning system identifies the location of said modular wireless communicator based on a radio frequency identification (RFID) connection.

9. The locator system of claim 6 wherein said positioning system identifies the location of said modular wireless communicator based on a BLUETOOTH® connection.

10. The locator system of claim 6 wherein said positioning system identifies the location of said modular wireless communicator based on a WiFi connection.

11. The locator system of claim 6 wherein said positioning system identifies the location of said modular wireless communicator based on an infrared (IR) connection.

12. A locator method, comprising:
   maintaining a log for a wireless communicator that attaches to at least one jacket, each jacket having an identifier, the log comprising a plurality of entries and each entry comprising a jacket identifier and a location;
   monitoring the wireless communicator for detection of occurrence of a log trigger event, wherein the log trigger event includes a designated action performed by a jacket to which the modular wireless communicator is attached, from among the group consisting of sending an SMS or an MMS message, browsing a designated web site, and playing an audio or a video file, whereby the log trigger events enable determination of a location where a jacket was last actively used with the wireless communicator; and
   in response to detection of occurrence of a log trigger event, adding a new entry to the log.

13. The method of claim 12 further comprising presenting a view of the log to a user.

14. The method of claim 12 further comprising generating navigable directions to reach a designated one of the locations recorded in the log.

15. The method of claim 12 further comprising identifying the location in the history log entry based on a connection of the wireless communicator to a device in its vicinity.

16. The method of claim 15 further comprising identifying the location in the history log entry based on a near field communication (NFC) connection.

17. The method of claim 15 further comprising identifying the location in the history log entry based on a radio frequency identification (RFID) connection.

18. The method of claim 15 further comprising identifying the location in the history log entry based on a BLUETOOTH® connection.

19. The method of claim 15 further comprising identifying the location in the history log entry based on a WiFi connection.

20. The method of claim 15 further comprising identifying the location in the history log entry based on an infrared (IR) connection.

* * * * *